Nov. 27, 1945.    D. DILEO    2,389,602
FISHING LINE REEL
Filed Feb. 3, 1945
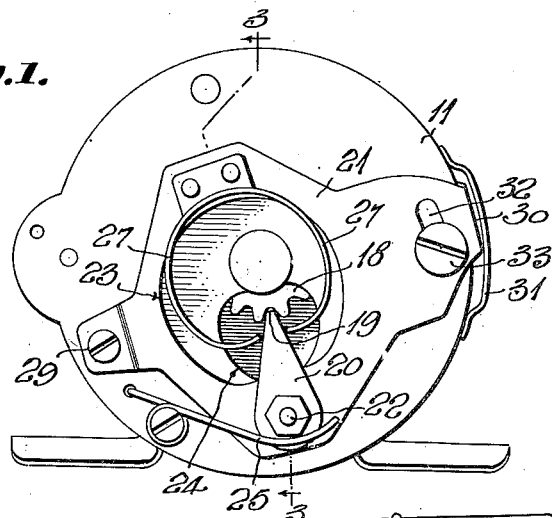
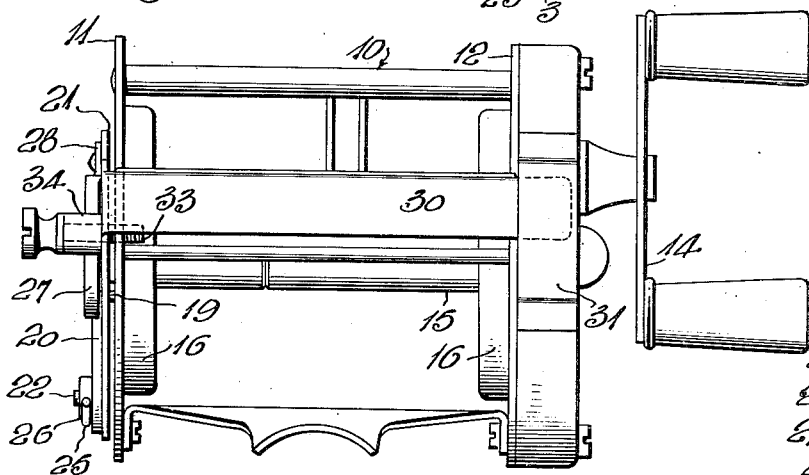
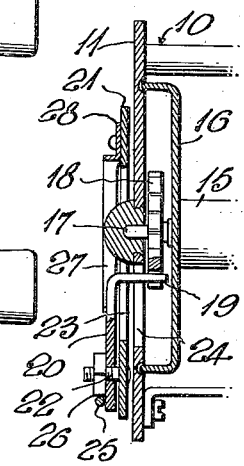
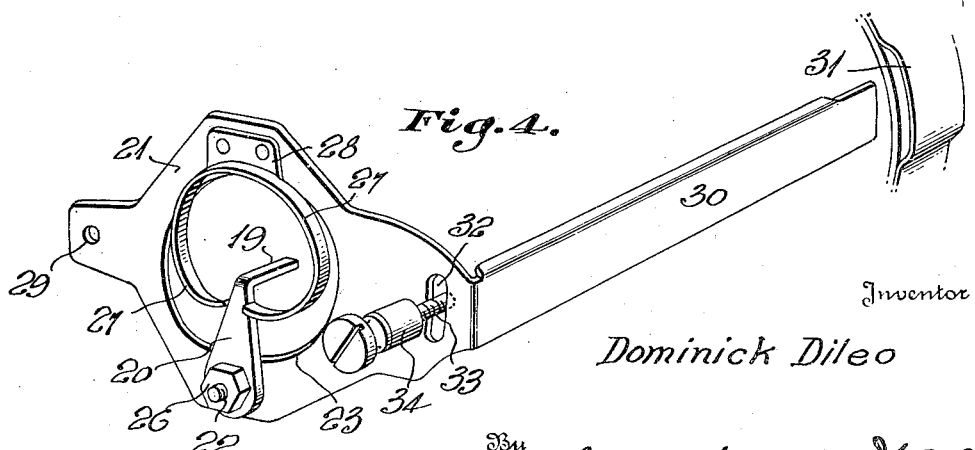
Inventor
Dominick Dileo Patented Nov. 27, 1945

2,389,602

UNITED STATES PATENT OFFICE 2,389,602

FISHING LINE REEL

Dominick Dileo, Utica, N. Y.

Application February 3, 1945, Serial No. 576,038

4 Claims. (Cl. 242—84.6)

The invention aims to provide a new and improved fishing line reel having novel and easily controlled means for either placing a drag on the reel proper or spool, or for allowing free spinning thereof, as requirements may dictate.

In carrying out the above end, a further object is to provide for convenient control of the drag by means of the thumb of the hand gripping the handle of the rod upon which the reel is mounted.

Yet another object is to provide a novel, inexpensive and durable construction which may be easily kept in proper condition for operation and may be easily repaired by the average fisherman.

With the foregoing in view, the invention resides in the novel subject matter hereinafter described and claimed, description being accomplished by reference to the accompanying drawing.

Fig. 1 is an end elevation of a reel constructed in accordance with the invention.

Fig. 2 is a rear elevation.

Fig. 3 is a vertical section on line 3—3 of Fig. 1.

Fig. 4 is a detail perspective view.

A preferred construction has been illustrated and will be rather specifically described, with the understanding that within the scope of the invention as claimed, variations may be made.

The frame structure 10 of the reel includes suitable end members 11 and 12 connected with each other in any preferred way, the end member 12 being constructed to house the usual gearing (not shown) for establishing a driving connection between the handle 14 and the reel or spool 15, said reel or spool being provided with the usual cupped end flanges 16.

Secured to the reel shaft 17 and disposed at the inner side of the end member 11, is a toothed wheel 18 which is cooperable with the lateral upper end 19 of a vertical pawl 20. This pawl is pivoted at its lower end to a vertical lever-forming plate 21, the pawl pivot being denoted at 22. The pawl end 19 passes through a relatively large opening 23 in the plate 21 and through a smaller opening 24 in the end member 11 and is intended to coact with the wheel 18 when said lever 21 occupies a raised position, in which position it is normally held by a suitable spring 25 mounted on the end member 11. This spring may well lie against the lower edge of a nut 26 on the pawl pivot 22 to hold said nut against accidental release.

Two substantially semi-circular spring arms 27 are carried by a suitable bracket 28 riveted or otherwise secured to the plate 21 above its opening 23, the lower ends of said arms 27 abutting opposite edges of the pawl 20 to yieldably hold the latter in neutral position and to permit it to swing in either direction to click over the teeth of the wheel 18, according to the direction in which the reel is rotated.

At its front end, the plate 21 is fulcrumed to the end member 11 as denoted at 29. The rear end of the plate 21 is integral with a thumb bar 30 which extends across the rear edges of the end members 11 and 12, the free end of said thumb bar being slidably engaged with a vertical guide 31 secured to said end member 12. The bar 30 may be conveniently depressed by the thumb of the hand which holds the rod upon which the reel is mounted, and it will be seen that such depression of said bar 30 will downwardly swing the plate 21 to free the lateral end 19 of the pawl 20 from the teeth of the wheel 18, allowing free and easy spinning of the reel or spool 15 whenever desired. Upon merely releasing the pressure upon the bar 30, the spring 25 will again upwardly swing the plate 21, again disposing the pawl end 19 in cooperative relation with the wheel 18, whereby said pawl and the wheel coact in providing a desirable drag or brake for the reel.

I prefer to provide the plate 21 with a vertical slot 32, and to pass a clamping screw 33 through said slot, said screw being threaded into the end member 11 and carrying a sleeve 34 to abut the outer side of said plate 21 when the screw is tightened. By tightening this screw, the plate 21 may be held in either raised or lowered position whenever desired, the drag being operative when said plate is in raised position and inoperative when said plate is in lowered position.

It will be seen from the foregoing that novel and advantageous provision has been made for carrying out the objects of the invention, and while preferred details have been disclosed, attention is again invited to the possibility of making variations within the scope of the invention as claimed.

I claim:

1. In a fishing line reel having a frame provided with end members, a reel extending between said end members, and a handle for said reel disposed adjacent one of said end members; a toothed wheel rotatable with said reel and disposed near the other of said end members, a lever at the outer side of said other end member and fulcrumed at its front end thereto for vertical movement, a pawl yieldably mounted on said lever for engagement with said toothed wheel when said lever occupies a raised position, spring means normally holding said lever in said raised position, a thumb bar at the rear edges of said end members, said thumb bar being secured at one of its ends to the rear end of said lever for depressing the latter to free said pawl from said toothed wheel when desired, and a guide secured to said one end member and slidably receiving the other end of said thumb bar.

2. In a fishing line reel having a frame provided with end members, a reel extending between said end members, and a handle for said reel disposed adjacent one of said end members; a toothed wheel rotatable with said reel and disposed at the inner side of the other of said end members, the latter being provided with an opening exposing at least the lower portion of said toothed wheel, a lever at the outer side of said other end member and fulcrumed at its front end thereto for vertical movement, a pawl yieldably mounted on said lever and having a laterally projecting end passing through said opening for engagement with said toothed wheel when said lever occupies a raised position, spring means normally holding said lever in said raised position, a thumb bar at the rear edges of said end members, said thumb bar being secured at one of its ends to the rear end of said lever for depressing the latter to free said pawl from said toothed wheel when desired, and a guide secured to said one end member and slidably receiving the other end of said thumb bar.

3. In a fishing line reel having a frame provided with end members, a reel extending between said end members, and a handle for said reel adjacent one of said end members; a toothed wheel rotatable with said reel and disposed at the inner side of the other of said end members, the latter being provided with an opening exposing at least the lower portion of said toothed wheel, a vertical plate at the outer side of said other end member and fulcrumed at its front end thereto for vertical movement, said plate having an opening communicating with the aforesaid opening, a pawl pivoted at its lower end to said plate below said openings, spring arms secured to said plate above said openings and engaged with said pawl for yieldably holding the latter in a neutral position, said pawl being provided with a laterally projecting upper end extending through said openings to engage said toothed wheel when said plate occupies a raised position, and spring means yieldably holding said plate in said raised position, the rear end of said plate being provided with a thumb piece for depressing it to free said pawl from said toothed wheel when desired.

4. In a fishing line reel having a frame provided with end members, a reel extending between said end members, and a handle for said reel disposed adjacent one of said end members; a toothed wheel rotatable with said reel and disposed at the inner side of the other of said end members, the latter being provided with an opening exposing at least the lower portion of said toothed wheel, a vertical plate at the outer side of said other end member and fulcrumed at its front end thereto for vertical movement, said plate having an opening communicating with the aforesaid opening, a pawl pivoted at its lower end to said plate below said openings, spring arms secured to said plate above said openings and engaged with said pawl for yieldably holding the latter in a neutral position, said pawl being provided with a laterally projecting upper end extending through said openings to engage said toothed wheel when said plate occupies a raised position, spring means yieldably holding said plate in said raised position, a thumb bar at the rear edges of said end members, said thumb bar being secured at one of its ends to the rear end of said plate for depressing the same when said pawl is to be freed from said toothed wheel, and a guide slidably receiving the other end of said thumb bar and secured to said one end member.

DOMINICK DILEO.